US009794218B2

(12) United States Patent
Geib

(10) Patent No.: US 9,794,218 B2
(45) Date of Patent: Oct. 17, 2017

(54) PERSISTENT NETWORK ADDRESSING SYSTEM AND METHOD

(71) Applicant: Trustiosity, LLC, Shelton, CT (US)

(72) Inventor: David J Geib, Shelton, CT (US)

(73) Assignee: Trustiosity, LLC, Shelton, CT (US)

( * ) Notice: Subject to any disclaimer, the term of this patent is extended or adjusted under 35 U.S.C. 154(b) by 227 days.

(21) Appl. No.: 14/696,660

(22) Filed: Apr. 27, 2015

(65) Prior Publication Data

US 2015/0312209 A1 Oct. 29, 2015

Related U.S. Application Data

(60) Provisional application No. 61/985,622, filed on Apr. 29, 2014.

(51) Int. Cl.
*H04L 29/12* (2006.01)
*H04L 12/24* (2006.01)

(52) U.S. Cl.
CPC ......... *H04L 61/2038* (2013.01); *H04L 41/08* (2013.01); *H04L 41/0803* (2013.01);
(Continued)

(58) Field of Classification Search
CPC ............. H04L 61/2038; H04L 61/2007; H04L 61/2503; H04L 61/256; H04L 61/2525;
(Continued)

(56) References Cited

U.S. PATENT DOCUMENTS 6,769,000 B1 * 7/2004 Akhtar ................... H04L 29/06
6,996,621 B1 * 2/2006 Borella ............. H04L 29/12009
370/352

(Continued)

FOREIGN PATENT DOCUMENTS

EP 1006465 A2 6/2000
EP 1253766 B1 12/2005
(Continued)

OTHER PUBLICATIONS

Adam Ierymenko, ZeroTeir One—Network Virtualization Everywhere, webpage: GitHub.com/zerotier/zerotierone/blob/master/readme.md, Nov. 26, 2014, 3 printed pages, GitHub.

*Primary Examiner* — Le H Luu
(74) *Attorney, Agent, or Firm* — UConn IP Law Clinic; Gregory Wuennenberg

(57) ABSTRACT

An improved computer system for maintaining a network connection whereby a local computer stores a persistent address application, which adapts at least one processor to: receive a first request, from a requesting application, to send a first outbound data to a remote computer; and present a local persistent address as the local routable address; and/or a remote persistent address as the remote routable address; wherein the persistent address application utilizes network implementation details. A method for providing persistent network addressing by receiving, at a local computer a first request, from a requesting application, to send a first outbound data to a remote computer; sending the first outbound data to the remote computer; and presenting a local persistent address as the local routable address and/or a remote persistent address as the remote routable address; wherein the persistent address application utilizes network implementation details.

27 Claims, 12 Drawing Sheets

(52) U.S. Cl.
CPC ...... *H04L 61/2007* (2013.01); *H04L 61/2503* (2013.01); *H04L 61/256* (2013.01); *H04L 61/2514* (2013.01); *H04L 61/2525* (2013.01); *H04L 61/1511* (2013.01)

(58) Field of Classification Search
CPC . H04L 61/2514; H04L 41/08; H04L 41/0803; H04L 49/354; H04L 29/12367; H04L 29/12009; H04L 29/06; H04L 29/06027; H04L 12/4641; H04W 52/0235; G01D 4/004
See application file for complete search history.

(56) References Cited

U.S. PATENT DOCUMENTS

| | | | |
|---|---|---|---|
| 7,032,242 B1* | 4/2006 | Grabelsky | H04L 29/12367 380/270 |
| 7,908,356 B2 | 3/2011 | Ishiyama et al. | |
| 8,295,271 B2 | 10/2012 | Radulovic | |
| 8,374,178 B2 | 2/2013 | Woo et al. | |
| 8,423,672 B2 | 4/2013 | Liu et al. | |
| 8,489,701 B2 | 7/2013 | Manion | |
| 8,953,610 B2* | 2/2015 | Vaswani | G01D 4/004 370/389 |
| 2002/0061011 A1* | 5/2002 | Wan | H04L 29/12009 370/352 |
| 2002/0136210 A1* | 9/2002 | Boden | H04L 12/4641 370/389 |
| 2003/0033418 A1* | 2/2003 | Young | H04L 29/06027 709/230 |
| 2005/0105508 A1* | 5/2005 | Saha | H04L 29/12009 370/352 |
| 2010/0235481 A1* | 9/2010 | Deutsch | H04L 29/12367 709/222 |
| 2014/0181248 A1* | 6/2014 | Deutsch | H04L 49/354 709/217 |
| 2015/0121066 A1* | 4/2015 | Nix | H04W 52/0235 713/155 |

FOREIGN PATENT DOCUMENTS

| | | |
|---|---|---|
| EP | 1664986 A2 | 6/2006 |
| EP | 0967769 A2 | 8/2006 |
| EP | 2475145 A1 | 1/2011 |
| EP | 1919168 A1 | 4/2011 |
| EP | 1361728 A2 | 5/2012 |
| WO | 03094017 A1 | 11/2003 |
| WO | 2004064356 A3 | 12/2004 |
| WO | 2006095451 A1 | 9/2006 |
| WO | 2006116449 A2 | 4/2009 |
| WO | 2009065996 A1 | 5/2009 |
| WO | 2011109786 A1 | 9/2011 |
| WO | 2013056999 A1 | 4/2013 |

* cited by examiner

PERSISTENT NETWORK ADDRESSING SYSTEM AND METHOD

CROSS REFERENCE TO RELATED APPLICATIONS

This application depends from and claims priority to U.S. Provisional Application No. 61/985,622 filed Apr. 29, 2015, the entire contents of which are incorporated herein by reference.

FIELD OF THE INVENTION

The present invention relates to network addressing.

BACKGROUND OF THE INVENTION

Electronic computers configured to communicate over a packet routing network have routable network addresses. In order for a local computer to send data to a remote computer, the local computer must have the remote routable address of the remote computer prior to sending data to the remote computer. Likewise, in order for the remote computer to send data to the local computer, the remote computer must have the local routable address of the local computer. Typically, the local computer includes its local routable address in the data sent to, and received by, the remote computer. Thus, the remote computer is able to obtain the local routable address directly from the local computer. However, as the local computer is usually the first computer to send data, it has no way to obtain the remote routable address directly from the remote computer. Accordingly, the local computer must receive the remote routable address, or information that can be used to resolve the remote routable address from a resolution system (such as the Domain Name System ("DNS")), of the remote computer from a source other than the remote computer. This is usually accomplished manually, via a user input, or programmatically, via software or a hardcoded instruction set. Once the local and remote computers have obtained the remote routable address and the local routable address, respectively, they may form a network connection.

The local computer may, at the request of a requesting application in communication with the operating system of the local computer, initiate a connection to the remote computer. Once established, the requesting application may exchange data with the remote computer as long as the connection remains open. However, should the local or remote routable address change while the connection is open, the connection will close whether or not the requesting application has finished exchanging data with the remote computer. In the case where the remote routable address changes, the source that supplied the remote routable address, or the information used to resolve the remote routable address, to the local computer may not have the new remote routable address, or the new information needed to resolve the remote routable address, of the remote computer. Likewise, the resolution system, if one was used, may also not have the new remote routable address of the local computer.

Similar problems arise when the local and/or remote computers are connected to a private network and an identifier (port number for IP based networks) for the local and/or remote computer is needed in addition to the local and/or remote routable address (the network address of the private network). When the remote computer is behind the private network and is assigned a new identifier, the connection will close and the local computer may be unable to quickly learn the new identifier needed to initiate a connection with the remote computer. This problem is exacerbated when the remote computer moves from one private network to the next while the requesting application is attempting to exchange data with the remote computer. In such a case, not only does the connection close with each move, it becomes very difficult for the local computer to quickly learn both the new network address and the identifier needed to initiate a new connection to the remote computer.

Likewise, when the local computer is behind the separate private network and is assigned a new identifier while the connection is open, the connection will subsequently close. Again, the problem is exacerbated when the local computer moves from one private network to the next while the requesting application is attempting to exchange data with the remote computer.

When both the remote computer and the local computer are located behind separate private networks, it is very difficult for the local computer to initiate a connection to the remote computer without the aid of a relay device.

Thus, there are many situations where the local computer is hindered from quickly, or in some cases completely prevented from, initiating a new connection to the remote computer. Additionally, in accordance with existing network protocols, many applications that fill the role of the requesting application are responsible for reestablishing the connection seamlessly without causing service interruptions. Unfortunately, many existing applications fail to do so, or they fail to do it elegantly.

SUMMARY OF THE INVENTION

The invention relates to an improved computer system for maintaining a network connection with a remote computer by providing persistent network addressing system, the improved computer system comprising: a local computer that includes: at least one processor; a local routable address; and a memory device that stores a persistent address application, the at least one processor being adapted by the persistent address application to: receive a first request, from a requesting application, to send a first outbound data to a remote computer, the remote computer including: at least one remote processor, a remote routable address, and a remote memory device; send the first outbound data to the remote computer based at least in part on the local and remote routable addresses; and present at least one of the following to the requesting application: a local persistent address as the local routable address, where the local persistent address is configured to remain the same while the local routable address changes; and a remote persistent address as the remote routable address, where the remote persistent address is configured to remain the same while the remote routable address changes; where the persistent address application utilizes network implementation details while allowing the requesting application to bypass network implementation details.

The invention also relates to a method for providing persistent network addressing comprising: receiving, at a local computer that includes: at least one processor; a local routable address; and a memory device that stores a persistent address application, a first request, from a requesting application, to send a first outbound data to a remote computer, the remote computer including: at least one remote processor; a remote routable address; and a remote memory device; sending, by way of the at least one processor being adapted by the persistent address application, the first outbound data to the remote computer based at least in part on the local and remote routable address; and presenting, by way of the at least one processor being adapted by the persistent address application, at least one of the following to the requesting application: a local persistent address as the local routable address, where the local persistent address is configured to remain the same while the local routable address changes; a remote persistent address as the remote routable address, where the remote persistent address is configured to remain the same while the remote routable address changes; and where the persistent address application utilizes network implementation details while allowing the requesting application to bypass network implementation details.

DETAILED DESCRIPTION

Figure 1:
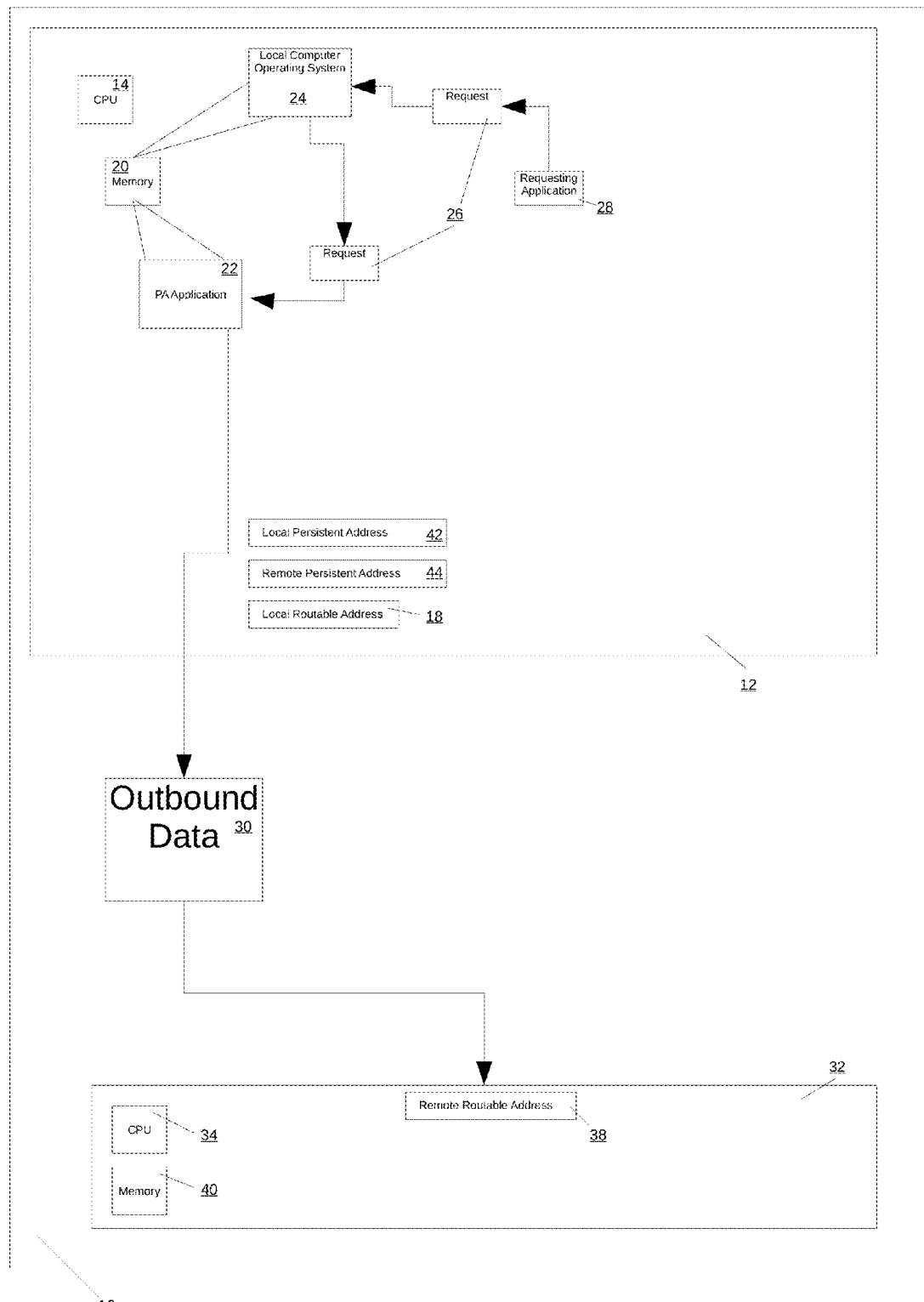
FIG. 1 is a schematic diagram depicting a computer system according to an embodiment.

Referring to FIG. 1, according to an embodiment, a computer system for providing persistent network addressing 10 comprises a local computer 12 that includes at least one local processor 14, a local routable address 18, and a memory device 20 that stores a persistent address application 22 and a local computer operating system 24. The at least one local processor 14 is adapted by the persistent address application 22 to receive a first request 26, from a requesting application 28, to send a first outbound data 30 to a remote computer 32. The remote computer 32 includes at least one remote processor 34, a remote routable address 38, and a remote memory device 40. The at least one local processor 14 is further adapted to send the first outbound data 30 to the remote computer 32 based at least in part on the local routable address 18 and remote routable address 38 and present at least one of the following to the requesting application 28: a local persistent address 42 as the local routable address 18, wherein the local persistent address 42 is configured to remain the same while the local routable address 18 changes; and a remote persistent address 44 as the remote routable address 38, wherein the remote persistent address 44 is configured to remain the same while the remote routable address 38 changes.

Figure 2:
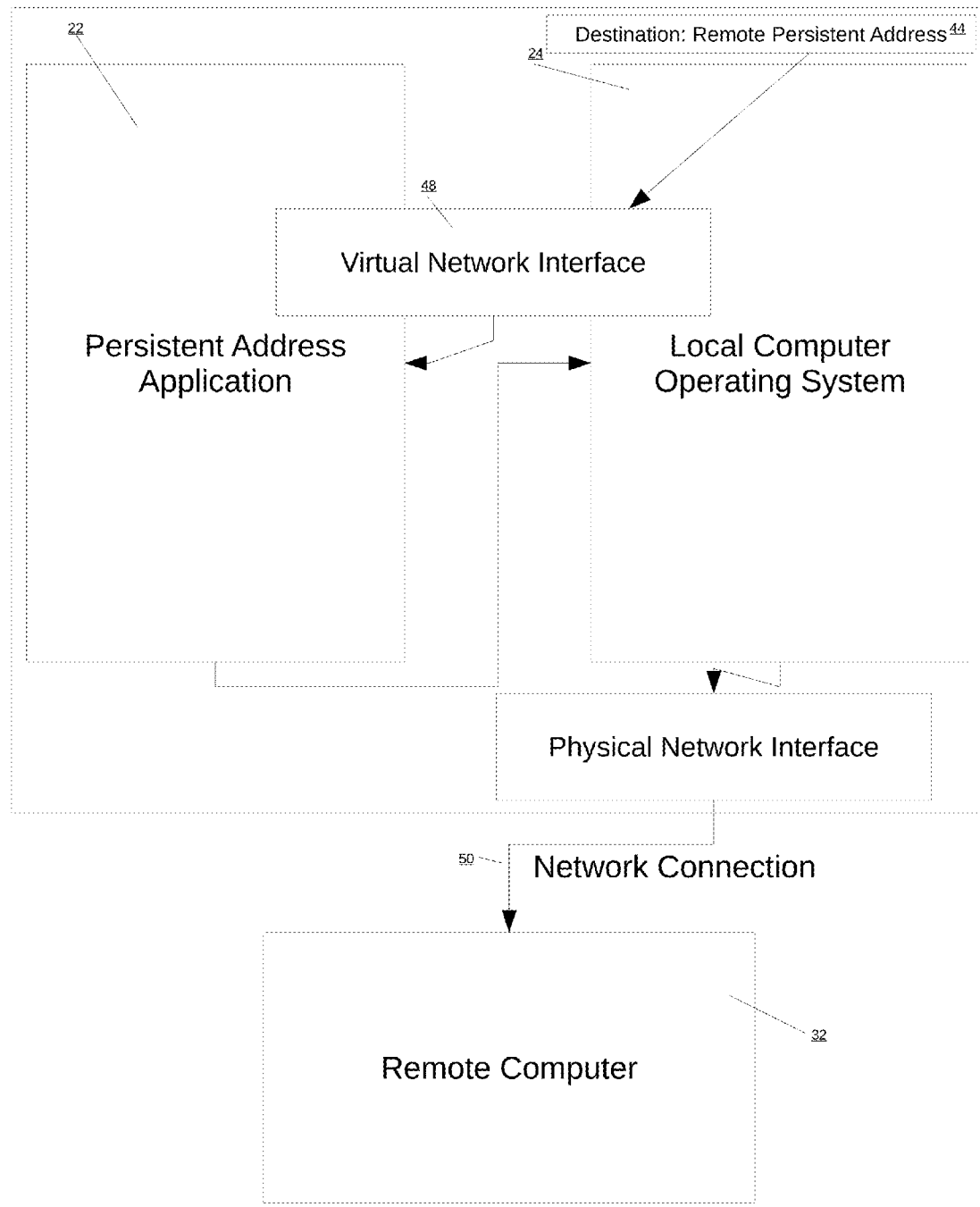
FIG. 2 is a schematic diagram depicting the local and remote computers of FIG. 1.

Referring to FIG. 2, according to an embodiment, the persistent address application 22 comprises a virtual network interface 48, such as a TUN/TAP interface on Linux, windows, and other common operating systems. The persistent address application 22 may be a separate application from the local computer operating system 24, or it may be integrated into the kernel of the local computer operating system 24. The local computer operating system 24 uses the virtual network interface 48 as the appropriate network interface to communicate with the remote persistent address 44 of the remote computer 32. When the persistent address application 22 receives data for remote persistent address 44 of the remote computer 32, the persistent address application 22 will initiate a network connection 50 with the remote computer 32.

Figure 3:
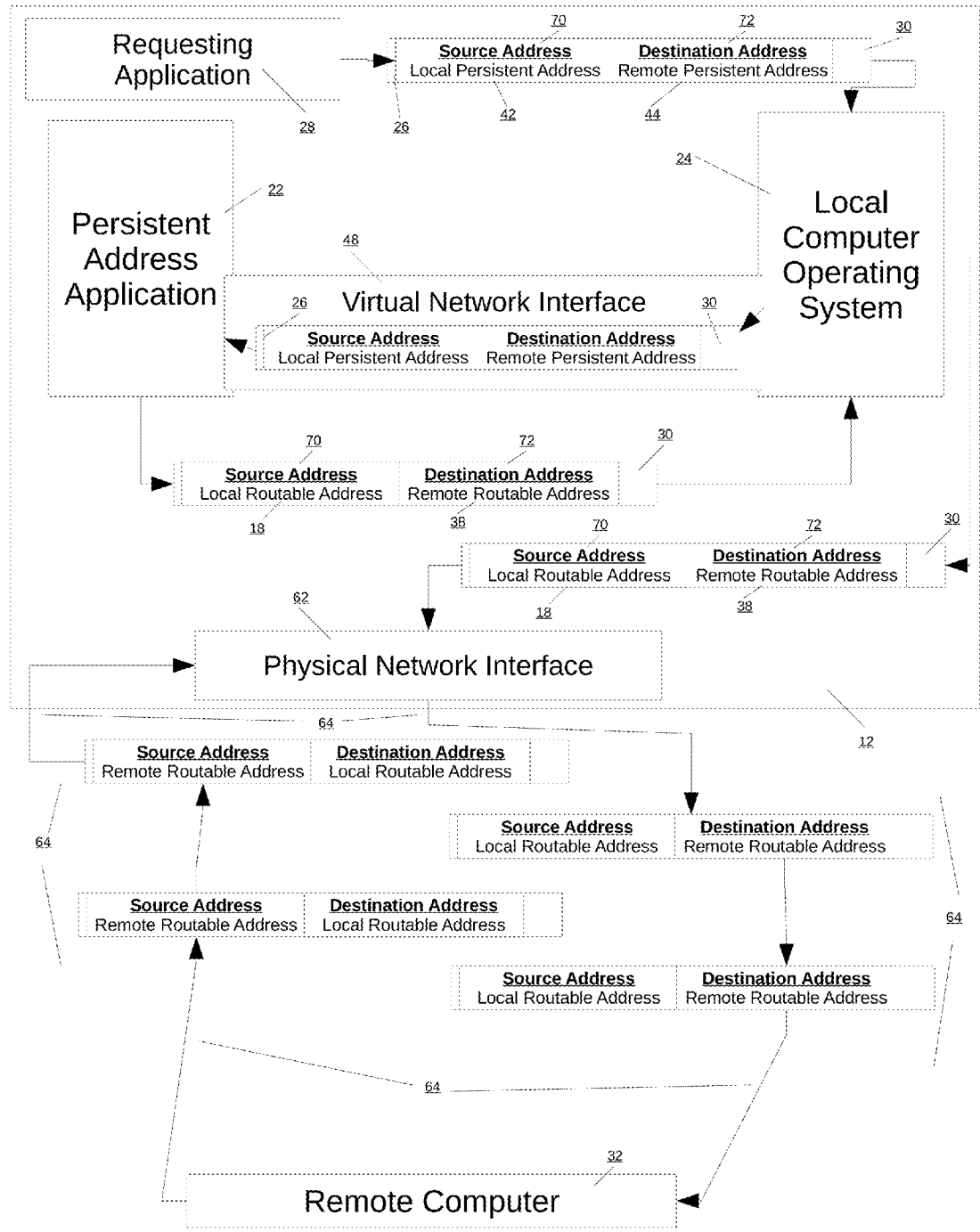
FIG. 3 is a schematic diagram depicting exchanging data between the local and remote computers of FIG. 1.

Referring to FIG. 3, according to an embodiment, in order to send the first outbound data 30 to the remote computer 32, the requesting application 28 sends the first request 26 to the local computer operating system 24. The local computer operating system 24 then passes the first request 26 to the persistent address application 22. The first request 26 may include a destination address 72 and a source address 70 that contain the values of the remote persistent address 44 and local persistent address 42, respectively. The persistent address application 22 will set the source address 70 and destination address 72 addresses to the local routable address 18 and remote routable address 38, respectively, and send the first outbound data 30 via the local computer operating system 24. The local computer operating system 24 then sends the first outbound data 30 to the local computer physical network interface 62 where the first outbound data 30 is delivered via a routing network 64 to the remote computer 32.

Figure 4:
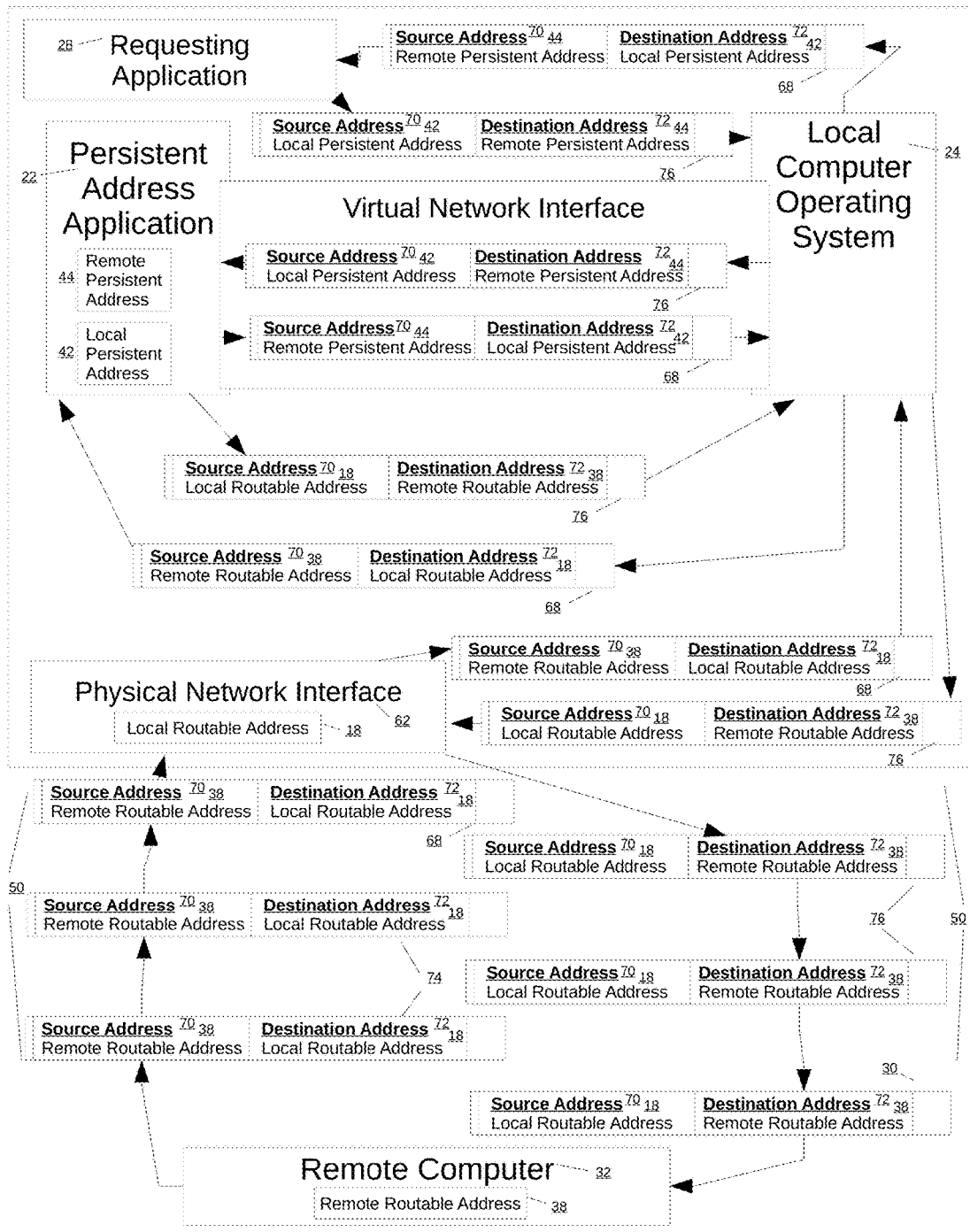
FIG. 4 is a schematic diagram depicting exchanging data between the local and remote computers of FIG. 1.

Referring to FIG. 4, according to an embodiment, when a first inbound data packet 68, sent from the remote computer 32 destined for the requesting application 28, is received at the local computer physical network interface 62, the local computer operating system 24 sends the first inbound data packet 68 to the persistent address application 22. The first inbound data packet 68 may include a source address 70 and a destination address 72 that contain the values of the remote routable address 38 and local routable address 18, respectively. The persistent address application 22 may replace the value of the source address 70 and destination address 72 address of the first inbound data packet 68 with the remote persistent address 44 and local persistent address 42, respectively, and then send the first inbound data packet 68 back to the local computer operating system 24.

The first outbound data 30 and first inbound data packet 68 may or may not be associated with a specific protocol handshake. That is, the first outbound data 30 and first inbound data packet 68 may contain information necessary to initiate the network connection 50, such as the first several packets of a TCP handshake, or, they may contain actual content to be exchanged between the requesting application 28 and the remote computer 32, as in the case of a UDP exchange. If the first inbound data packet 68, or any subsequent inbound data packet 74, contain application payload data to be exchanged between the requesting application 28 and the remote computer 32, the local computer operating system 24, after having received the first inbound data packet 68 or subsequent inbound data packet 74 from the persistent address application 22, sends the first inbound data packet 68 or subsequent inbound data packet 74 to the requesting application 28.

Additionally, the requesting application will send any subsequent outbound data packet 76, which the requesting application 28 wishes to send to the remote computer 32, to the local computer operating system 24 and assigns the destination address 72 and source address 70 addresses as the remote persistent address 44 and local persistent address 42, respectively. The local computer operating system 24 then passes the subsequent outbound data packet 76 to the persistent address application 22 which sets the destination address 72 and source address 70 to the remote routable address 38 and the local routable address 18, respectively. The persistent address application 22 then passes the subsequent outbound data packet 76 to the local computer operating system 24 which then sends the subsequent outbound data packet 76 to the local computer physical network interface 62. The local computer physical network interface 62 then places the subsequent outbound data packet 76 "on the wire" where it is delivered via the network connection 50 to the remote computer 32.

Thus, according to embodiments, the persistent address application 22 intercepts data exchanged between the requesting application 28 and the local computer operating system 24 before the local computer operating system's 24 network stack sends outgoing data to the local computer physical network interface 62, and before the local computer operating system's 24 network stack sends incoming data to the requesting application 28.

Figure 5:
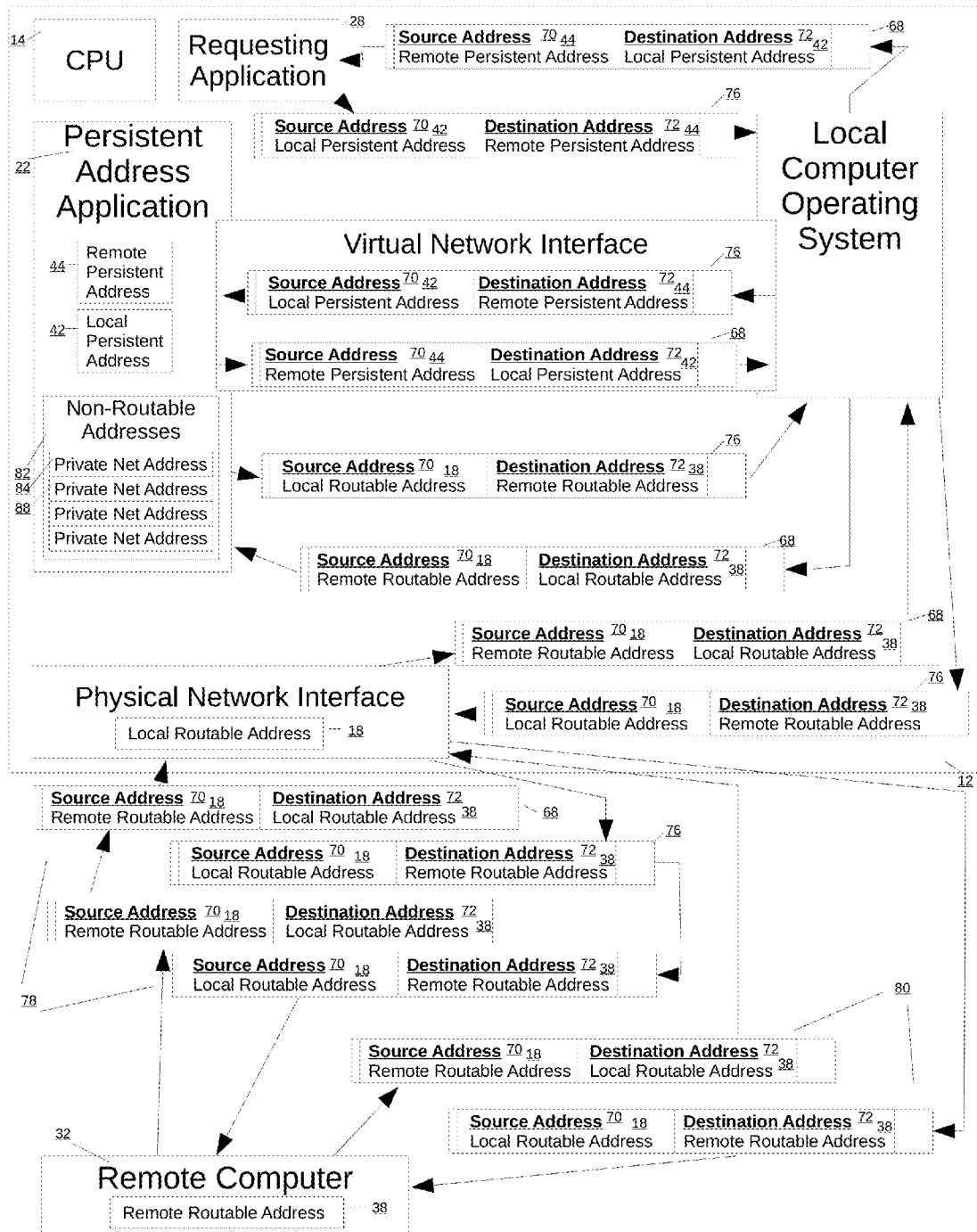
FIG. 5 is a schematic diagram depicting exchanging data over a first and second network connection between the local and remote computers of FIG. 1.

Referring to FIG. 5, In the case where the local computer 12 and remote computer 32 are exchanging data via a connection oriented protocol, such as TCP, over a first network connection 78 and the local routable address 18 and/or remote routable address 38 change, resulting in the closing of the first network connection 78 before the exchange of data has concluded, the persistent address application 22 will initiate a second network connection 80 with the remote computer 32. The persistent address application 22 continues to replace the values of the destination address 72 and source address 70 of the first inbound data packets 68 or the subsequent inbound data packet 74 traversing the second network connection 80 with the local persistent address 42 and remote persistent address 44, respectively. Additionally, the persistent address application 22 will replace the values of the source address 70 and destination address 72 of the subsequent outbound data packet 76 with the new local routable address 18 and remote routable address 38, respectively. Thus, if the remote computer 32 is configured to treat the second network connection 80 as continuation of the first network connection 78, the requesting application 28 acts as if the first network connection 78 and second network connection 80 are continuous. That is, the effects of the closing of the first network connection 78 will have a minimal effect on the requesting application's 28 ability to exchange data with the remote computer 32.

According to an embodiment, the persistent address application 22 further comprises a plurality of non-routable addresses 82. The at least one local processor 14 is further adapted by the persistent address application 22 to set at least one of the following: the local persistent address 42 to a first non-routable address 84, of the plurality of non-routable addresses 82; and the remote persistent address 44 to a second non-routable address 88, of the plurality of non-routable addresses 82. The plurality of non-routable addresses 82 may be of a different address family or protocol family than the local routable address 18 and remote routable address 38. For example, where the plurality of non-routable addresses 82 are of the IPv4 family, the local routable address 18 and/or remote routable address 38 may be from the IPv6 family while the local persistent address 42 and/or remote persistent address 44 may be assigned IPv4 addresses from the plurality of non-routable addresses 82. Thus, such embodiments allow applications that serve as the requesting application 28 to communicate over networks they may not have been configured for, without the need to supply the necessary protocol communication information via an update or recompilation of the requesting application 28.

Figure 6:
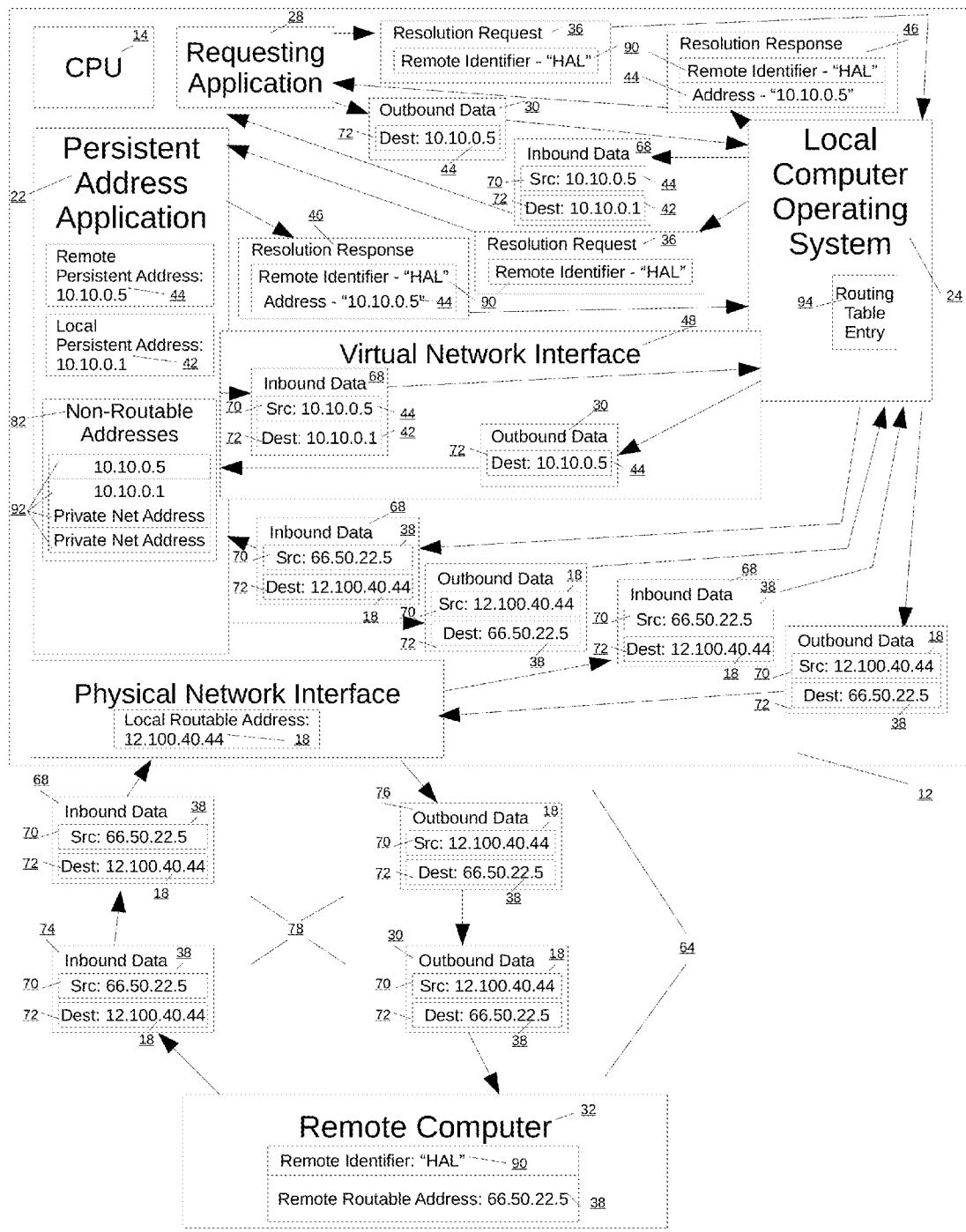
FIG. 6 is a schematic diagram depicting exchanging data over the first network connection between the local and remote computers of FIG. 1.

Referring to FIG. 6, according to an embodiment, the remote computer 32 is associated with a remote computer identifier 90, and the at least one local processor 14 is further adapted by the persistent address application 22 to resolve the remote routable address 38 from the remote computer identifier 90. The remote computer identifier 90 corresponds to the remote computer 32.

According to an embodiment, the plurality of non-routable addresses 82 comprises at least one private network address 92. A private network address is a non-public network address such as, but not limited to, those specified in RFC1918 and RFC3927. The at least one private network address 92 may be selected from a common subnet designated for assignment to the remote computer identifier 90, or remote computer identifiers in the case where the local computer 12 wishes to open network connections to more than one remote computer. A first entry 94 may be added to the kernel routing table of the local computer operating system 24 to forward all data destined for the common subnet to the virtual network interface 48.

For example, in an embodiment the local computer 12 and remote computer 32 are connected to a first IP based routing network 64. The requesting application 28 may wish to initiate a first network connection 78 (other transport layer protocols, such as UDP, may be used as well) to the remote computer 32 with the remote computer identifier 90 "HAL". Accordingly, the requesting application 28 generates and sends a resolution request 36 to the local computer operating system 24 requesting resolution of the remote computer identifier 90 to a destination address 72. The local computer operating system 24 sends the resolution request 36 to the persistent address application 22.

Once the resolution request 36 has been received by the persistent address application 22, the persistent address application 22 resolves the remote computer identifier 90 "HAL" to the remote routable address 38. In the current example, the persistent address application 22 has resolved the remote computer identifier 90 "HAL" to the remote routable address 38 "66.50.22.5". However, instead of informing the requesting application 28 that the destination address 72 for "HAL" is "66.50.22.5", the persistent address application 22 selects a private network address 92, "10.10.0.5", from the plurality of non-routable addresses 82 to be the remote persistent address 44 for the remote computer 32 with the remote computer identifier 90 of "HAL" and provides the remote persistent address 44 in the resolution response 46.

The requesting application will then send a first outbound data 30 destined for the remote computer 32 with the remote computer identifier 90 of "HAL" to the remote persistent address 44 "10.10.0.5" via the local computer operating system 24. The local computer operating system 24 sends the first outbound data 30 destined for the remote persistent address 44 to the persistent address application 22. The persistent address application 22 then uses the remote routable address 38 "66.50.22.5" as the destination address 72 of the first outbound data 30 and sends the first outbound data 30 to the local computer operating system 24 which initiates the first network connection 78 with the remote computer 32 that has the remote routable address 38 "66.50.22.5".

Unless the remote routable address 38 changes, the persistent address application 22 will assign the destination address 72 of all subsequent outbound data packets 76, destined for the remote persistent address 44 of the remote computer 32, to the remote routable address 38, in this example "66.50.22.5".

When the local computer operating system 24 receives the first inbound data packet 68, from the remote computer 32, the local computer operating system 24 forwards the first inbound data packet 68 to the persistent address application 22. The persistent address application 22 then replaces the source address 70 of the first inbound data packet 68, which in this example is "66.50.23.5", with the remote persistent address 44 "10.10.0.5".

Additionally, and assuming the local routable address 18 of the local computer is "12.100.40.44", the persistent address application 22 also selects "10.10.0.1" from the plurality of non-routable addresses 82 to be the local persistent address 42 of the local computer 12. Accordingly, the persistent address application 22 replaces the destination address 72 of the first inbound data packet 68, which in this case is "12.100.40.44", with the local persistent address 42 "10.10.0.1". Until the connection is closed, the persistent address application 22 will continue to place the remote persistent address 44, in this case "10.10.0.5", in the source address 70 and the local persistent address 42, in this case "10.10.0.1" in the destination address 72 of all subsequent inbound data packets 74, destined for the requesting application 28.

If the payload of the first inbound data packet 68 or subsequent inbound data packet 74 contain(s) data that is to be exchanged between the requesting application 28 and the remote computer 32, the persistent address application 22 then delivers the data contained in the first inbound data packets 68 or subsequent inbound data packets 74 either to the local computer operating system 24, which then delivers the data to the requesting application 28, or straight to the requesting application 28. Thus, the persistent address application 22 presents the remote persistent address 44 "10.10.0.5" to the requesting application 28 as the remote routable address 38 of the remote computer 32. Likewise, the persistent address application 22 also presents the local persistent address 42 "10.10.0.1" to the requesting application 28 as the local routable address 18 of the local computer 12.

Accordingly, the requesting application 28 behaves as if the local routable address 18 of the local computer 12 is "10.10.0.1" and as if the remote routable address 38 of the remote computer 32 is "10.10.0.5".

Figure 7:
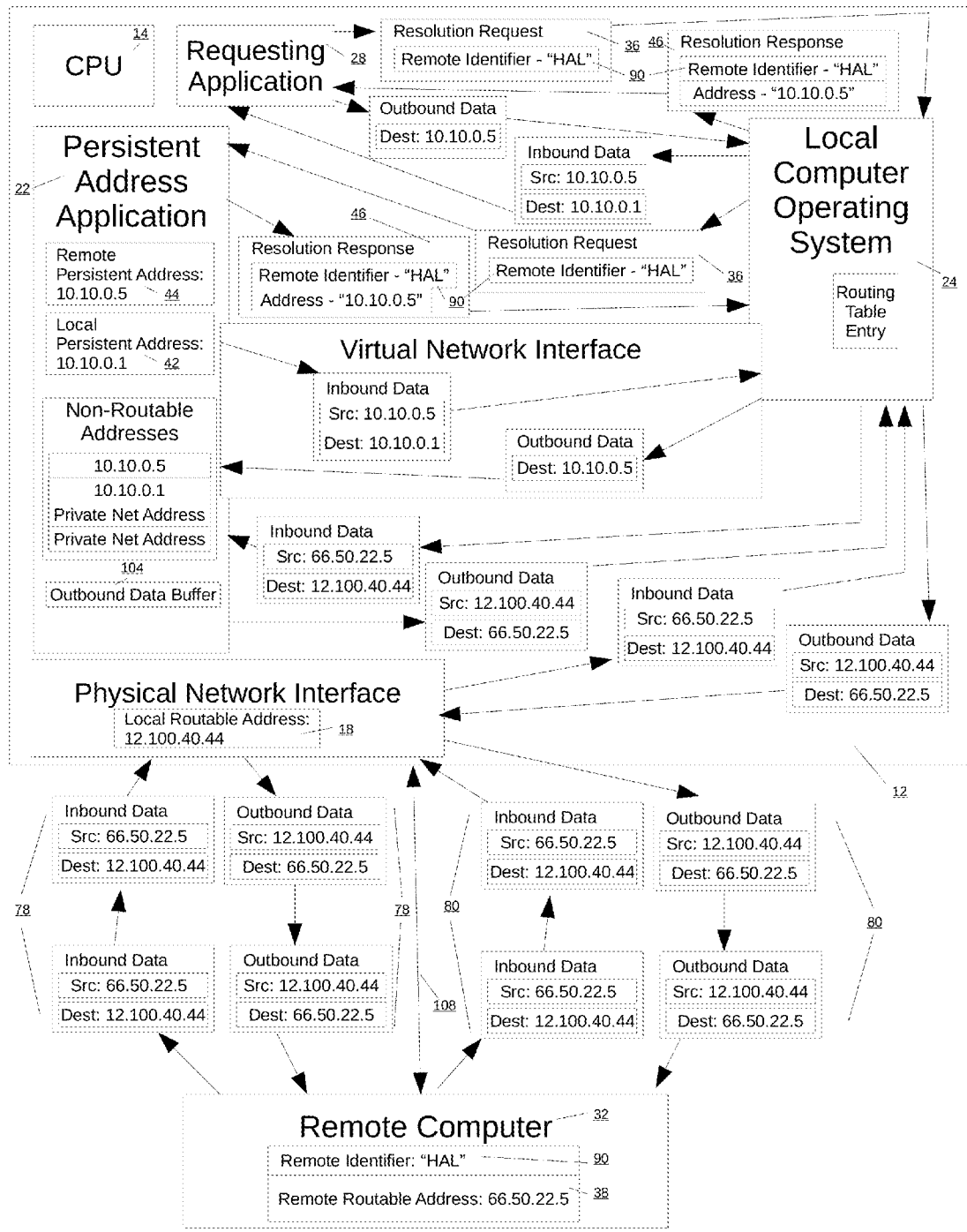
FIG. 7 is a schematic diagram depicting exchanging data over the first and second network connections between the local and remote computers of FIG. 1.

Referring to FIG. 7, now suppose the local computer 12 is assigned a new local routable address 18 while the first network connection 78 is open. The local computer operating system 24 may detect the change in the local routable address 18 and close the first network connection 78. In the prior art, the requesting application 28 will be notified by the local computer operating system 24 of the closing of the first network connection 78. However, in the disclosed embodiments herein, because the persistent address application 22 intercepts data exchanged between the remote computer 32 and the requesting application 28, the persistent address application 22 is able to detect the closing of the first network connection 78 and, in response, initiate a second network connection 80 with the remote computer 32 with the remote computer identifier 90 of "HAL" without the need for the local computer operating system 24 to notify the requesting application 28 of the closure of the first network connection 78.

Unlike the first network connection 78, which was initiated in response to the first request 26 or resolution request 36 generated by the requesting application 28, the persistent address application 22 will itself initiate the second network connection 80 to the remote routable address 38 "66.50.22.5". If the persistent address application 22 does not know the remote routable address 38, or if the remote routable address 38 of the remote computer 32 has been assigned a new value, the persistent address application 22 will resolve the remote computer identifier 90 "HAL" to the remote routable address 38.

In embodiments, to include those utilizing protocols besides TCP/IP, the local persistent address application 22 may further comprise an outbound data buffer 104 which enqueue subsequent outbound data packets 76 received from the local computer operating system 24 after the first network connection 78 has closed and before the second network connection 80 is opened.

Once the second TCP/IP connection 80 is open, the persistent address application 22 will receive subsequent inbound data packets 74 from the remote computer 32, replace the destination IP address 72 and the source address 70 of each subsequent inbound data packet 74, received from the local computer operating system 24 after the second TCP/IP connection 80 has been opened, with the local persistent address 42 and remote persistent address 44, respectively. The persistent address application 22 then sends each subsequent inbound data packet 74 received from the local computer operating system 24 after the second TCP/IP connection 80 has been opened, to the local computer operating system 24 for delivery to the requesting application 28. Additionally, the persistent address application 22 will dequeue the subsequent outbound data packets 76 enqueued on the outbound data buffer 104, replace the destination address 72 and the source address 70 of each dequeued subsequent outbound data packet 76, and additional subsequent outbound data packets 76 received from the local computer operating system 24 after the second TCP/IP connection 80 has been opened, with the active remote routable address 38 and local routable address 18, respectively. The persistent address application 22 then sends each dequeued subsequent outbound data packet 76, and the additional subsequent outbound data packets 76 received from the local computer operating system 24 after the second TCP/IP connection 80 has been opened, to the local computer operating system 24 for delivery to the remote computer 32.

According to an embodiment, the at least one local processor 14 is further adapted by the persistent address application 22 to establish a control channel 108 that may be used to govern the exchange of data between the local computer 12 and remote computer 32. The control channel 108 may be a control channel network connection, akin to FTP's port 21, or a control channel data field included in the data exchanged between the local computer 12 and remote computer 32. For instance, the control channel data field could be a prepended header to data packets exchanged between the local computer 12 and remote computer 32.

Figure 8:
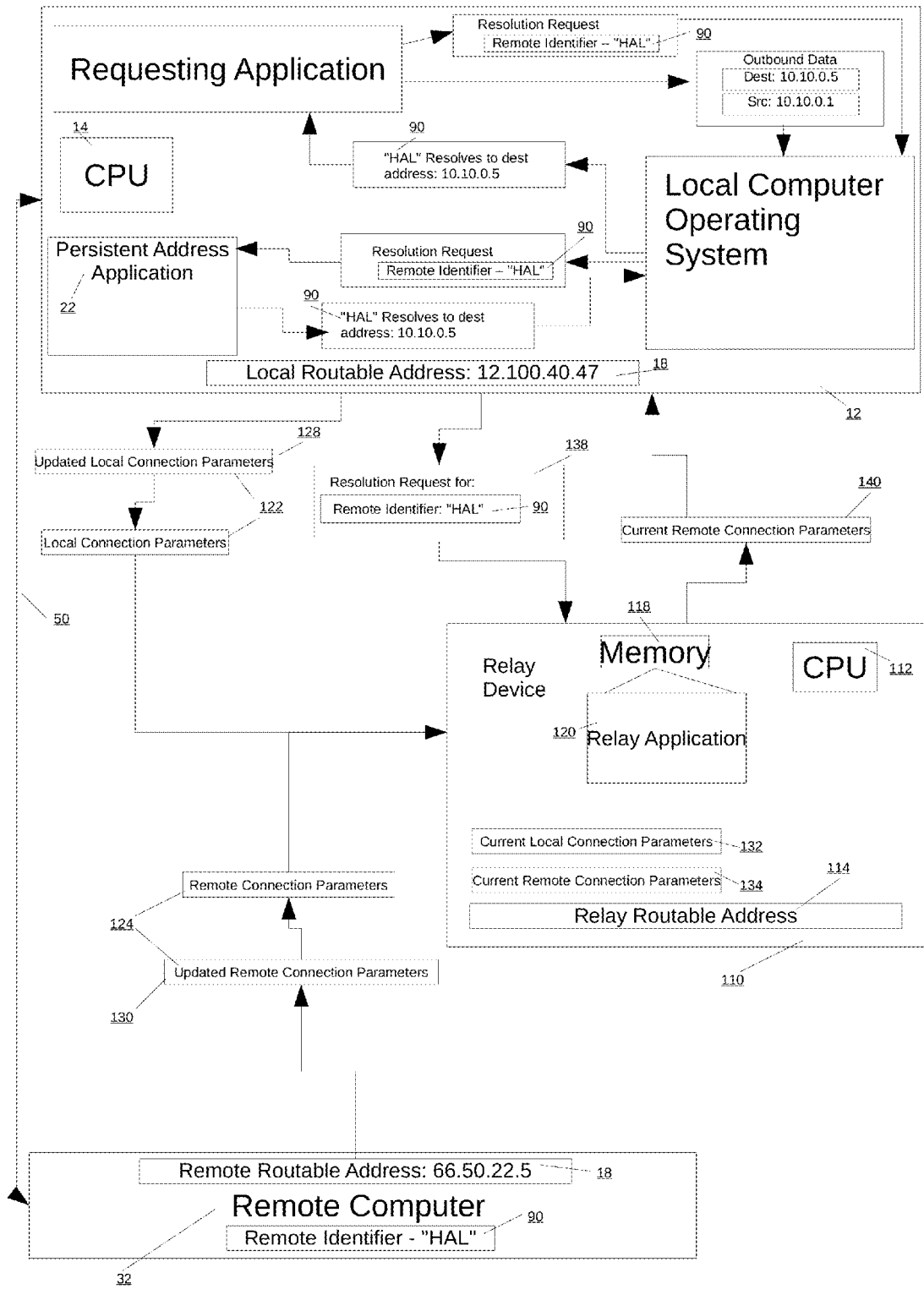
FIG. 8 is a schematic diagram depicting an embodiment of the computer system of FIG. 1 comprising a relay device.

Referring to FIG. 8, according to an embodiment, the at least one local processor 14 is further adapted by the persistent address application 22 to resolve the remote computer identifier 90 by way of an associated relay device 110. The associated relay device 110 comprises at least one relay processor 112, a relay routable address 114, and a relay memory device 118 that stores a relay application 120. The local computer 12 and remote computer 32 may supply a local 122 and a remote 124 set of connection parameters, respectively, to the associated relay device 110. The local 122 and remote 124 set of connection parameters may comprise any connection information necessary to enable the local computer 12 and/or remote computer 32 to establish the network connection 50 with the other. Such connection information may comprise assigned routable network address, active port numbers, preferred protocols from any OSI network layer to include, but not limited to, IPv4, IPv6, ICMP, IPsec, TCP, UDP, DCCP, SCTP, TLS, and RSCP. When the local routable address 18 or remote routable address 38 changes, the local computer 12 or remote computer 32, respectively, may send an updated local 128 or an updated remote 130 set of connection parameters to the associated relay device 110. The associated relay device 110 designates the most recently received local 122 or remote 124 set of connection parameters as the current local connection parameter 132 or current remote connection parameter 134 set of connection parameters.

The at least one relay processor 112 is adapted by the relay application 120 to receive, from the local computer 12, a resolution request 138. The resolution request 138 includes the remote computer identifier 90. The at least one relay processor 112 is further adapted to send, to the local computer 12, a first set of connection parameters 140. The first set of connection parameters 140 is based at least in part on the current remote set of connection parameters 134. The remote computer 32 may also query the associated relay device 110 in a manner similar to the resolution request 138 sent by the local computer 12 to obtain the current local set of connection parameters 132.

Figure 9:
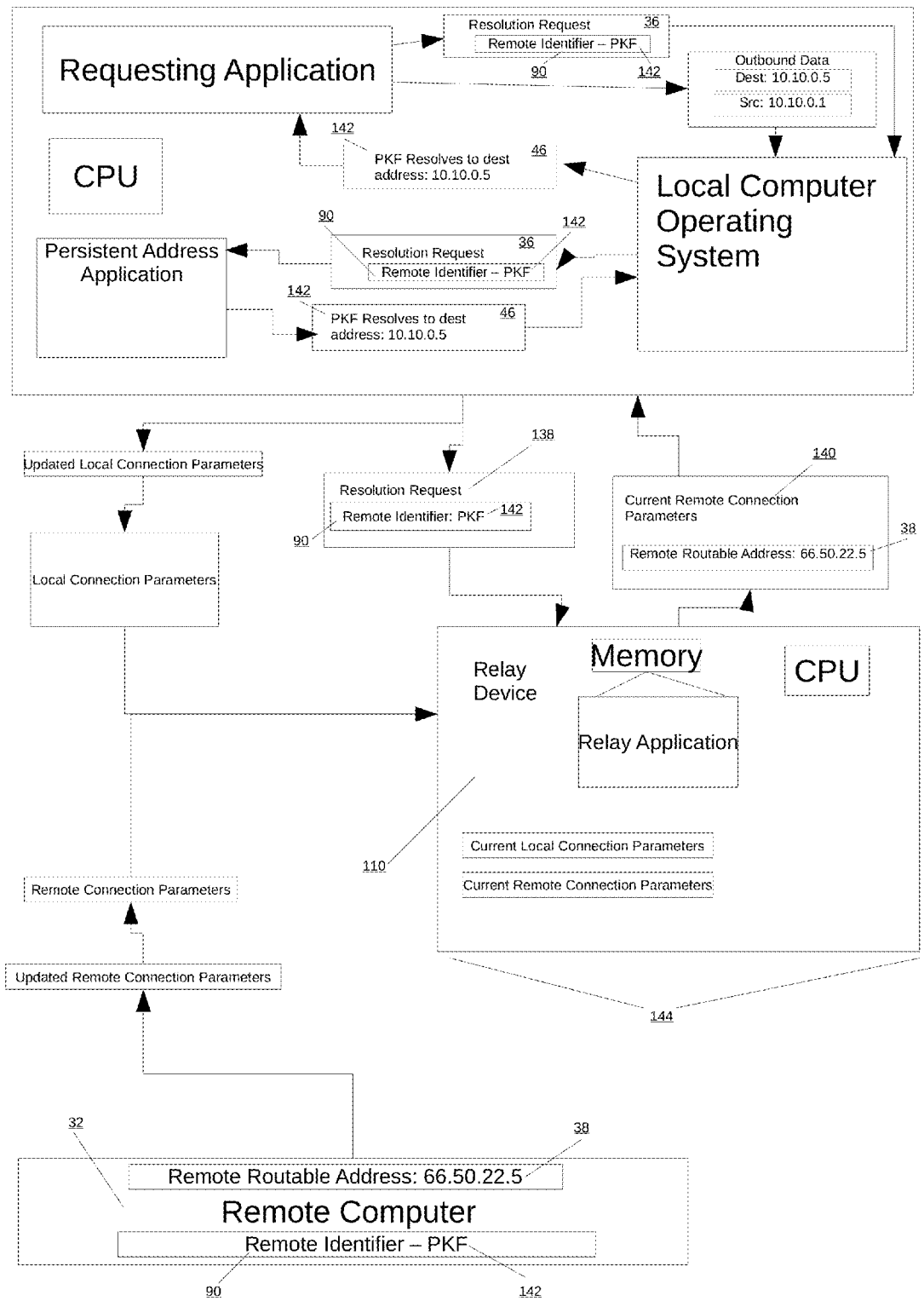
FIG. 9 is a schematic diagram depicting an embodiment of the computer system of FIG. 1 comprising a relay device where the remote identifier is a cryptographic public key.

Referring to FIG. 9, according to an embodiment, the remote computer identifier 90 comprises a public key fingerprint 142. Using a public key fingerprint 142 as the remote computer identifier 90 allows cryptographic authentication of the remote computer 32; however, this is not required where cryptographic authentication is either unnecessary or provided for by alternate means.

According to an embodiment, the first set of connection parameters 140 includes the remote routable address 38.

According to an embodiment, the associated relay device 110 may further comprise a centralized server 144.

Figure 10:
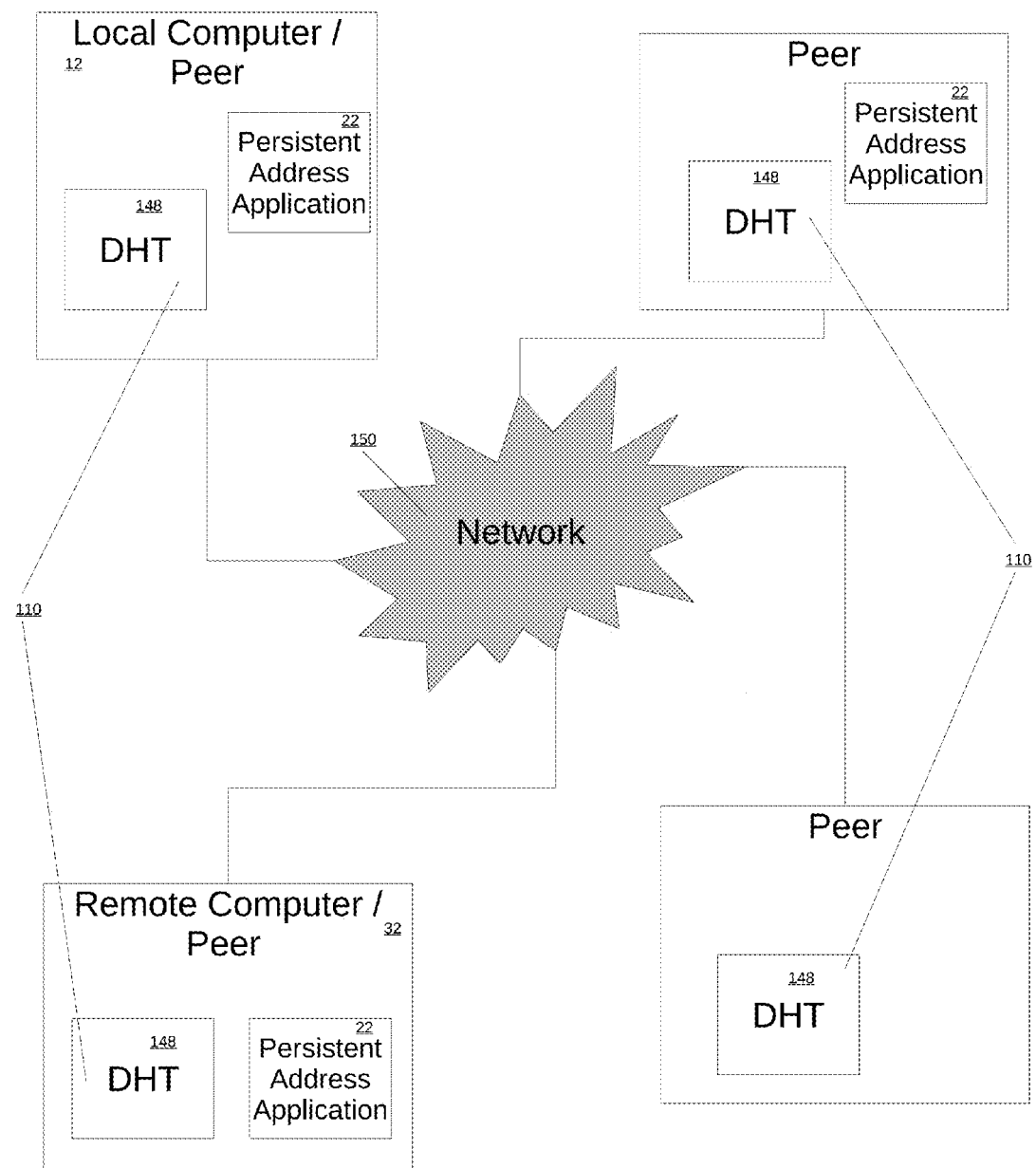
FIG. 10 is a schematic diagram depicting an embodiment of the computer system of FIG. 1 where the local and remote computers of FIG. 1 are peers, in a peer to peer network, and the relay device comprises a distributed hash table ("DHT").

Referring to FIG. 10, according to an embodiment, the associated relay device 110 may further comprise a distributed hash table ("DHT") 148. The DHT 148 is a distributed network of devices that are each responsible for resolving resolution requests for specific identifiers. Each device in the network can route resolution requests and messages to the device responsible for resolving a given identifier. According to an embodiment, the local computer 12 and remote computer 32 may be peers in a peer to peer network 150. The peer to peer network 150 may be a pure peer to peer network, a hierarchical peer to peer network, or a hybridized peer to peer network. In such embodiments, the DHT 148 may be distributed over the peers, super-nodes within the peer to peer network, or a combination thereof.

Figure 11:
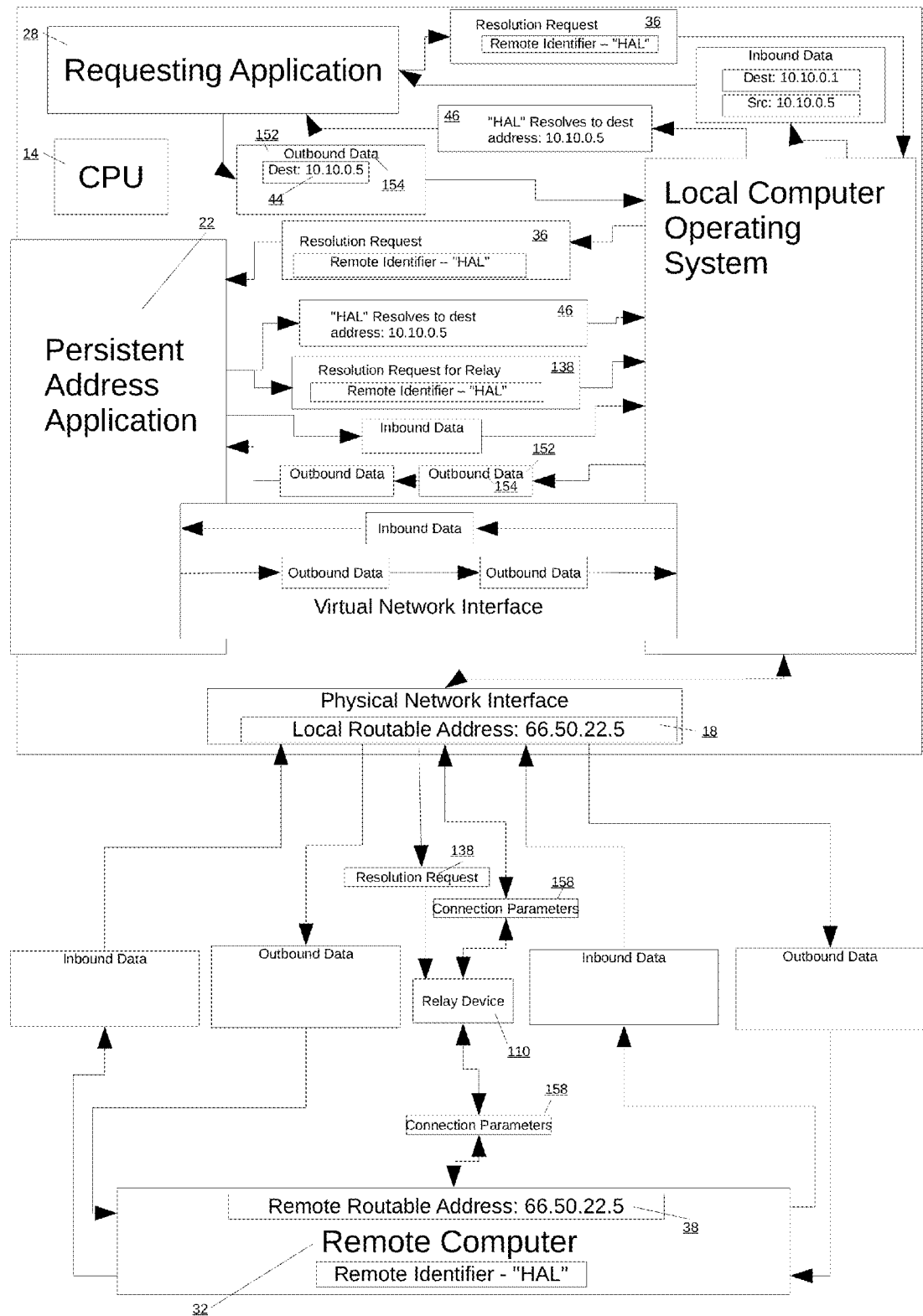
FIG. 11 is a schematic diagram and flow chart depicting a second request to exchange data between the local and remote computers of FIG. 1.

Referring to FIG. 11, according to an embodiment, the at least one local processor 14 is further adapted by the persistent address application 22 to receive a second request 152, from the requesting application 28, to send a second data 154 to the remote computer 32. The second data 154 may be the previously mentioned subsequent outbound data packet 76 or the second data 154 may be associated with a different transaction with the remote computer 32.

According to an embodiment, the at least one local processor 14 is further adapted by the persistent address application 22 to negotiate with the remote computer 32, or the associated relay device 110, a second set of connection parameters 158 after detecting one of the following: the second data 154 is unable to be delivered to the remote computer 32; the local routable address 18 is about to change; and/or the remote routable address 38 is about to change.

Figure 12:
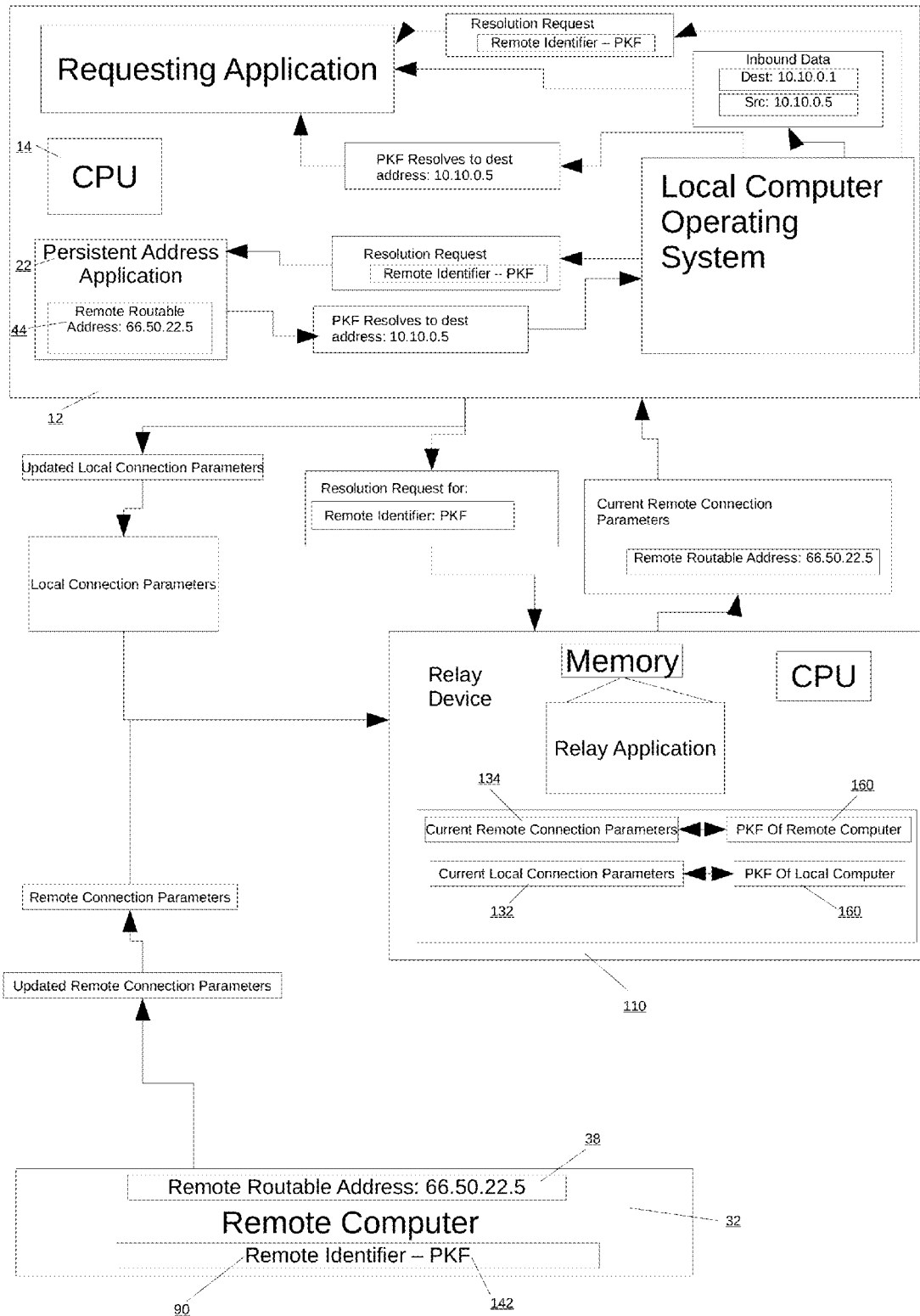
FIG. 12 is a schematic diagram depicting resolving the remote computer identifier by supplying the cryptographic key of the remote computer of FIG. 1 to the relay device of FIG. 8.

Referring to FIG. 12, according to an embodiment, the remote routable address 38, resolved from the remote computer identifier 90, is cryptographically authenticated based at least in part on the public key fingerprint 142. The associated relay device 110 may also use the public key fingerprint 142 as a lookup key 160 for the remote computer 32. Thus, in cases where the remote computer identifier 90 is a public key fingerprint 142, the persistent address application 22 may resolve the remote set of connection parameters 134 by supplying the associated relay device 110 with the public key fingerprint 142 that corresponds to the remote computer 32.

According to an embodiment, in situations where one, or both, of the local computer 12 and remote computer 32 are located on private networks (such as peers located behind two separate NAT devices), the local computer 12 and/or remote computer 32 may use the associated relay device 110 to facilitate a connection (such as coordinating a UDP hole punch).

According to an embodiment, once the local computer 12 and remote computer 32 have ceased exchanging data for a period of time longer than a specified timeout period, open network connections between the two may be closed. The at least one local processor 14 may be further adapted by the persistent address application 22 to maintain a remote association between the remote persistent address 44 and the remote computer identifier 90 for a grace period. The remote association allows communication between the local and remote computer to be reestablished even after the specified timeout period has expired. In some embodiments, the remote association may be permanent.

Referring again to FIG. 7, according to an embodiment, the first outbound data 30 is encrypted before it is sent to the remote computer 32.

Another aspect of the invention is a computerized method for providing persistent network addressing that incorporates the components of the previously described embodiments for the computerized system for providing persistent network addressing 10. Another aspect of the invention is a non-transitory, tangible computer-readable medium storing instructions adapted to be executed by a computer processor to perform the computerized method.

The disclosed system and method has many advantages. The persistent address application may enable a requesting application to operate without regard to network implementation details. Network implementation details comprise details of how data is transported or secured. Network implementation details may also comprise one or more network protocols, such as IPv4, IPv6 or MPLS. Network implementation details may also comprise particular methods of NAT traversal, such as UDP hole punching, Universal Plug and Play (UPnP), NAT Port Map Protocol (NAT-PMP), Port Control Protocol, or Traversal Using Relays around NAT (TURN). Network implementation details may also comprise particular methods of authenticating or encrypting data, such as IPSec, Transport Layer Security (TLS) or CurveCP. Network implementation details may also comprise a transition from a routable address to another or from a particular set of network implementation details to another, such as from a network protocol to another. Another advantage is that an embodiment with support for particular network implementation details may enable a requesting application to communicate via a network with those network implementation details even if a requesting application does not otherwise support all or any of the same network protocols, NAT traversal methods, authentication or encryption methods or other network implementation details.

Another advantage is that an embodiment of the disclosed system and method with support for a plurality of network implementation details may allow a requesting application to communicate via a network with any network implementation details supported by the embodiment. The complexity of supporting a plurality of network implementation details can be consolidated into an embodiment, enabling a plurality of requesting applications to communicate via networks with a plurality of network implementation details without the need to implement support for all network implementation details in each requesting application, thereby enabling a requesting application that would otherwise not have supported the same plurality of network implementation details as the embodiment to communicate via a network with any of the plurality of network implementation details supported by the embodiment and reducing wasteful duplication of effort, code size or complexity for each requesting application that would otherwise have implemented support for an overlapping plurality of network implementation details as the embodiment.

Another advantage is that a requesting application may observe a persistent address continuously even when a network configuration change occurs, consolidating the complexity of transitioning from a routable address to another or a set of network implementation details to another into an embodiment, thereby reducing errors in a requesting application that does not handle the network configuration change and reducing wasteful duplication of effort, code size or complexity in each requesting application that would otherwise have implemented support for the network configuration change.

The computer system for persistent network addressing 10 has the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein. For example, the computer system for persistent network addressing 10 may include at least one processor, system memory, including random access memory (RAM) and read-only memory (ROM), an input/output controller, and one or more data storage structures. All of these latter elements are in communication with the at least one processor to facilitate the operation of the computer system for persistent network addressing 10 as discussed above. Suitable computer program code may be provided for executing numerous functions, including those discussed above in connection with the computer system for persistent network addressing 10, persistent address application 22, local computer 12 and remote computer 32 and associated relay device 110. The computer program code may also include program elements such as an operating system, a database management system and "device drivers" that allow the computer system for persistent network addressing 10, persistent address application 22, local computer 12 and remote computer 32, and associated relay device 110 to interface with computer peripheral devices (e.g., a video display, a keyboard, a computer mouse, etc.).

The at least one: local processor 14; remote processor 34; or relay processor 112, may include one or more conventional microprocessors and one or more supplementary co-processors such as math co-processors or the like. Elements in communication with each other need not be continually signaling or transmitting to each other. On the contrary, such elements need transmit to each other as necessary, may actually refrain from exchanging data most of the time, and may require several steps to be performed to establish a communication link therebetween.

The data storage structures such as memory discussed herein may comprise an appropriate combination of magnetic, optical and/or semiconductor memory, and may include, for example, RAM, ROM, flash drive, an optical disc such as a compact disc and/or a hard disk or drive. The data storage structures may store, for example, information required by the computer system for persistent network addressing 10 and/or one or more programs (e.g., computer program code and/or a computer program product) adapted to direct the computer system for persistent network addressing 10 to receive the first request 26 and second request 152 from the requesting application, and resolve the remote routable address 38 of the remote computer 32 based at least in part on the remote computer identifier 90 according to the various embodiments discussed herein. The programs may be stored, for example, in a compressed, an uncompiled and/or an encrypted format, and may include computer program code. The instructions of the computer program code may be read into a main memory of a processor from a computer-readable medium. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

The program may also be implemented in programmable hardware devices such as field programmable gate arrays, programmable array logic, programmable logic devices or the like. Programs may also be implemented in software for execution by various types of computer processors. A program of executable code may, for instance, comprise one or more physical or logical blocks of computer instructions, which may, for instance, be organized as an object, procedure, process or function. Nevertheless, the executables of an identified program need not be physically located together, but may comprise separate instructions stored in different locations which, when joined logically together, comprise the program and achieve the stated purpose for the programs such as preserving privacy by executing the plurality of random operations. In an embodiment, an application of executable code may be a compilation of many instructions, and may even be distributed over several different code partitions or segments, among different programs, and across several devices.

The term "computer-readable medium" as used herein refers to any medium that provides or participates in providing instructions to at least one: local processor 14; remote processor 34; or relay processor 112, of the computer system for persistent network addressing 10 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to at least one processor for execution. For example, the instructions may initially be borne on a magnetic disk of a remote computer (not shown). The remote computer can load the instructions into its dynamic memory and send the instructions over an Ethernet connection, cable line, or telephone line using a modem. A communications device local to a computing device (e.g., a server) can receive the data on the respective communications line and place the data on a system bus for at least one processor. The system bus carries the data to main memory, from which the at least one processor retrieves and executes the instructions. The instructions received by main memory may optionally be stored in memory either before or after execution by the at least one processor. In addition, instructions may be received via a communication port as electrical, electromagnetic or optical signals, which are exemplary forms of wireless communications or data streams that carry various types of information.

By allowing applications running on the local computer 12 to establish network connections to the remote computer 32, while presenting the network connection 50 as a persistent network connection, despite connectivity related changes in the underlying network connection 50, the computer system for persistent network addressing 10 facilitates better network connectivity by decreasing instances of application layer errors caused by intermittent network connectivity. Additionally, embodiments of the present invention allow legacy applications that have been hardcoded to use certain network protocols, such as IPv4 to communicate using a different protocol, such as IPv6, without the need to update or recompile the legacy applications. More so, it is well within the knowledge of one skilled in the art to adapt the principles of the present invention to enable legacy applications, configured to communicate using certain combination of OSI protocols, to communicate using a combination of any OSI, or other standard, protocols.

Although this invention has been shown and described with respect to the detailed embodiments thereof, it will be understood by those skilled in the art that various changes in form and detail thereof may be made without departing from the spirit and the scope of the invention.

What is claimed is:

1. An improved computer system for maintaining a network connection with a remote computer by providing persistent network addressing system, the improved computer system comprising:
 a local computer that includes:
  at least one processor;
  a local routable address; and
  a memory device that stores a persistent address application, the at least one processor being adapted by the persistent address application to:
   receive a first request, from a requesting application, to send a first outbound data to a remote computer, the remote computer including:
    at least one remote processor,
    a remote routable address, and
    a remote memory device;
   send the first outbound data to the remote computer based at least in part on the local and remote routable addresses; and
   present at least one of the following to the requesting application:
    a local persistent address as the local routable address, wherein the local persistent address is configured to remain the same while the local routable address changes; and
    a remote persistent address as the remote routable address, wherein the remote persistent address is configured to remain the same while the remote routable address changes;
 wherein the persistent address application utilizes network implementation details while allowing the requesting application to bypass network implementation details.

2. The improved computer system for providing persistent network addressing of claim 1,
 wherein network implementation details are selected from the group consisting of methods for transporting data; methods for securing data; one or more network protocols; methods of NAT traversal; methods of authenticating and/or encrypting data; or transitions from a first routable address to a second routable address or from a first set of network implementation details to a second set of network implementation details.

3. The improved computer system for providing persistent network addressing of claim 2, wherein the improved computer system supports and the requesting application does not otherwise support at least one of the following: a network protocol, a NAT traversal method, an authentication method, an encryption method, or other network implementation details.

4. The improved computer system for providing persistent network addressing of claim 2, wherein the requesting application communicates via a network with the network implementation details.

5. The improved computer system for providing persistent network addressing of claim 2, wherein the requesting application observes a persistent address continuously even when a network configuration change occurs, consolidating the complexity of transitioning from a routable address to another or a set of network implementation details to another into an embodiment, thereby reducing errors in a requesting application that does not handle the network configuration change and reducing wasteful duplication of effort, code size or complexity in each requesting application that would otherwise have implemented support for the network configuration change.

6. The improved computer system for providing persistent network addressing of claim 1, further comprising a plurality of non-routable addresses,
 wherein the at least one processor is further adapted by the persistent address application to set at least one of the following:

the local persistent address to a first non-routable address, of the plurality of non-routable addresses; and the remote persistent address to a second non-routable address, of the plurality of non-routable addresses.

7. The improved computer system for providing persistent network addressing of claim 6,
wherein the plurality of non-routable addresses comprises at least one private network address.

8. The improved computer system for providing persistent network addressing of claim 1,
wherein the first request is associated with a remote computer identifier, and the at least one processor is further adapted by the persistent address application to resolve the remote routable address from the remote computer identifier.

9. The improved computer system for providing persistent network addressing of claim 8,
wherein the at least one processor is further adapted by the persistent address application to resolve the remote computer identifier by way of an associated relay device, the associated relay device comprising:
at least one relay processor;
a relay routable address; and
a relay memory device that stores a relay application, the at least one relay processor being adapted by the relay application to:
receive, from the local computer, a resolution request, the resolution request including the remote computer identifier; and
send, to the local computer, a first set of connection parameters comprising a remote routable address.

10. The improved computer system for providing persistent network addressing of claim 9,
wherein the associated relay device further comprises a distributed hash table.

11. The improved computer system for providing persistent network addressing of claim 9,
wherein the at least one processor is further adapted by the persistent address application to:
receive a second request, from the requesting application, to send a second data to the remote computer;
negotiate, with the remote computer or the associated relay device, a second set of connection parameters after detecting one of the following:
the second data is unable to be delivered to the remote computer;
the local routable address is about to change; and
the remote routable address is about to change.

12. The improved computer system for providing persistent network addressing of claim 8,
wherein the remote computer identifier comprises a public key fingerprint.

13. The improved computer system for providing persistent network addressing of claim 12,
wherein a selected one of the remote routable address, a first outbound data, a first inbound data, a subsequent outbound data, or a subsequent inbound data, is cryptographically authenticated based at least in part on the public key fingerprint.

14. The improved computer system of claim 1, further comprising:
a memory device that stores a persistent address application, the at least one processor being adapted by the persistent address application to:

receive a first request, from a requesting application, to send a first outbound data to a remote computer, the remote computer including:
at least one remote processor;
a remote routable address; and
a remote memory device,
wherein the first request is associated with a remote computer identifier, the remote computer identifier comprising a public key fingerprint;
resolve the remote routable address from the remote computer identifier by way of an associated relay device, the associated relay device comprising:
at least one relay processor;
a relay routable address; and
a relay memory device that stores a relay application, the at least one relay processor being adapted by the relay application to:
receive, from the local computer, a resolution request, the resolution request including the remote computer identifier; and
send, to the local computer, a first set of connection parameters including the remote routable address,
wherein a selected one of the remote routable address, a first outbound data, a first inbound data, a subsequent outbound data, or a subsequent inbound data, is cryptographically authenticated based at least in part on the public key fingerprint;
send the first outbound data to the remote computer based at least in part on the local and remote routable addresses,
wherein the first outbound data is encrypted before it is sent to the remote computer;
set at least one of the following:
a local persistent address to a first non-routable address, of a plurality of non-routable addresses; and
a remote persistent address to a second non-routable address, of the plurality of non-routable addresses;
present at least one of the following to the requesting application:
the local persistent address as the local routable address, wherein the local persistent address is configured to remain the same while the local routable address changes; and
the remote persistent address as the remote routable address,
wherein the remote persistent address is configured to remain the same while the remote routable address changes;
receive a second request, from the requesting application, to send a second data to the remote computer; and
negotiate, with the remote computer or the associated relay device, a second set of connection parameters after detecting one of the following:
the second data is unable to be delivered to the remote computer;
the local routable address is about to change;
the remote routable address is about to change; and
wherein the persistent address application utilizes network implementation details while allowing the requesting application to bypass network implementation details.

15. A method for providing persistent network addressing comprising:
receiving, at a local computer that includes:
at least one processor;
a local routable address; and
a memory device that stores a persistent address application, a first request, from a requesting application, to send a first outbound data to a remote computer, the remote computer including:
    at least one remote processor;
    a remote routable address; and
    a remote memory device;
sending, by way of the at least one processor being adapted by the persistent address application, the first outbound data to the remote computer based at least in part on the local and remote routable address; and
presenting, by way of the at least one processor being adapted by the persistent address application, at least one of the following to the requesting application:
    a local persistent address as the local routable address, wherein the local persistent address is configured to remain the same while the local routable address changes;
    a remote persistent address as the remote routable address, wherein the remote persistent address is configured to remain the same while the remote routable address changes; and
wherein the persistent address application utilizes network implementation details while allowing the requesting application to bypass network implementation details.

16. The method for providing persistent network addressing of claim 15 further comprises,
    enabling a requesting application to communicate via a network with network implementation details when a requesting application does not otherwise support all or any of the same network protocols, NAT traversal methods, authentication methods, encryption methods, and/or network implementation details.

17. The method for providing persistent network addressing of claim 15 further comprises,
    enabling a requesting application to communicate via a network with any network implementation details supported therein.

18. The method for providing persistent network addressing of claim 15 further comprises:
    monitoring of the network implementation details by the requesting application; and
    consolidating the complexity of transitioning from a first routable address to a second routable address and/or a first set of network implementation details to a second set of network implementation details, thereby reducing errors in a requesting application, wasteful duplication of effort, code size, and complexity in each requesting application.

19. The method for providing persistent network addressing of claim 15 further comprising: setting at least one of the following:
    the local persistent address to a first non-routable address, of a plurality of non-routable addresses; and
    the remote persistent address to a second non-routable address, of the plurality of non-routable addresses.

20. The method for providing persistent network addressing of claim 19,
    wherein the plurality of non-routable addresses comprises at least one private network address.

21. The method for providing persistent network addressing of claim 15 further comprising:
    associating the first request with a remote computer identifier; and
    resolving, by way of the persistent address application adapting the at least one processor, the remote routable address from the remote computer identifier.

22. The method for providing persistent network addressing of claim 21,
    wherein resolving, by way of the persistent address application adapting the at least one processor, the remote routable address from the remote computer identifier further comprises:
        using an associated relay device, the associated relay device comprising:
            at least one relay processor;
            a relay routable address; and
            a relay memory device that stores a relay application, the at least one relay processor being adapted by the relay application to perform:
                receiving, from the local computer, a resolution request, the resolution request including the remote computer identifier; and
                sending, to the local computer, a first set of connection parameters comprising a remote routable address.

23. The method for providing persistent network addressing of claim 22,
    wherein the associated relay device further comprises a distributed hash table.

24. The method for providing persistent network addressing of claim 22 further comprising:
    receiving, at the at least one processor, a second request, from the requesting application, to send a second data to the remote computer; and
    negotiating, by way of the local computer with the remote computer or the associated relay device, a second set of connection parameters after detecting one of the following:
        the second data is unable to be delivered to the remote computer;
        the local routable address is about to change; and
        the remote routable address is about to change.

25. The method for providing persistent network addressing of claim 21,
    wherein the remote computer identifier comprises a public key fingerprint.

26. The method for providing persistent network addressing of claim 25 further comprising:
    cryptographically authenticating the selected one of the remote routable address, a first outbound data, a first inbound data, a subsequent outbound data, or a subsequent inbound data, based at least in part on the public key fingerprint.

27. The method for providing persistent network addressing of claim 15 further comprising:
    receiving, at a local computer that includes:
        at least one processor;
        a local routable address; and
        a memory device that stores a persistent address application,
    a first request, from a requesting application, to send a first outbound data to a remote computer, the remote computer including:
        at least one remote processor;
        a remote routable address; and
        a remote memory device,
    the at least one processor being adapted by the persistent address application to perform:
        sending the first outbound data to the remote computer based at least in part on the local and remote routable address; and
        presenting at least one of the following to the requesting application:

a local persistent address as the local routable address, wherein the local persistent address is configured to remain the same while the local routable address changes; and a remote persistent address as the remote routable address, wherein the remote persistent address is configured to remain the same while the remote routable address changes, setting at least one of the following:
   the local persistent address to a first non-routable address, of a plurality of non-routable addresses; and
   the remote persistent address to a second non-routable address, of the plurality of non-routable addresses;

associating the first request with a remote computer identifier;

resolving, by way of the persistent address application adapting the at least one processor, the remote routable address from the remote computer identifier, by using an associated relay device, the associated relay device comprising:
   at least one relay processor;
   a relay routable address; and
   a relay memory device that stores a relay application, the at least one relay processor being adapted by the relay application to perform:
      receiving, from the remote computer, a resolution request, the resolution request including the remote computer identifier; and
      sending, to the local computer, a first set of connection parameters;

wherein the plurality of non-routable addresses comprises at least one private network address, the remote computer identifier comprises a public key fingerprint, and the first set of connection parameters includes the remote routable address;

receiving, at the at least one processor, a second request, from the requesting application, to send a second data to the remote computer;

negotiating, by way of the local computer with the remote computer or the associated relay device, a second set of connection parameters after detecting one of the following:
   the second data is unable to be delivered to the remote computer;
   the local routable address is about to change; and
   the remote address is about to change;

cryptographically authenticating a selected one of the remote routable address, a first inbound data, a subsequent outbound data, or a subsequent inbound data based at least in part on the public key fingerprint;

encrypting the first outbound data before it is sent to the remote computer; and wherein the persistent address application utilizes network implementation details while allowing the requesting application to bypass network implementation details.

* * * * *